June 15, 1965 C. P. BOWMAN 3,189,731

SYSTEM FOR SENSING

Filed May 18, 1961

INVENTOR.
CHARLES P. BOWMAN

BY William R Jacox

ATTORNEY

United States Patent Office 3,189,731

Patented June 15, 1965

3,189,731
SYSTEM FOR SENSING

Charles P. Bowman, Dayton, Ohio, assignor to The Standard Register Company, a corporation of Ohio
Filed May 18, 1961, Ser. No. 111,066
2 Claims. (Cl. 235—61.11)

This application relates to a system for sensing. The application relates more particularly to apparatus for reading and transmitting information applied to a web or sheet.

This invention relates to the apparatus disclosed in copending application Serial No. 578,062, filed April 13, 1956, now Pat. 3,044,694 which is owned by the assignee of this application.

The invention further relates to transistorized circuitry for use in business apparatus for controlling operation of devices in accordance with information provided upon a web or sheet. As an example, the apparatus of this invention is used to sense information which has been applied to original sales records and to transfer the information to receiver apparatus such as tape recorders, card punching machines, printing machines or the like. In particular, the apparatus of this invention is used to sense or read deposits of material applied to a web or sheet.

An object of this invention is to provide means for accurately and speedily sensing relatively small deposits of information material carried by a sheet or web.

It is another object of this invention to provide such sensing or reading means which is capable of operation from information material which is visible or invisible to the human eye.

Another object of this invention is to provide such apparatus which is capable of sensing or reading simultaneously many deposits of information material.

Other objects and advantages reside in the construction of parts, the combination thereof, the method of manufacture, and the mode of operation, as will become more apparent from the following description.

Figures 1, 2, 3, 4, 5:
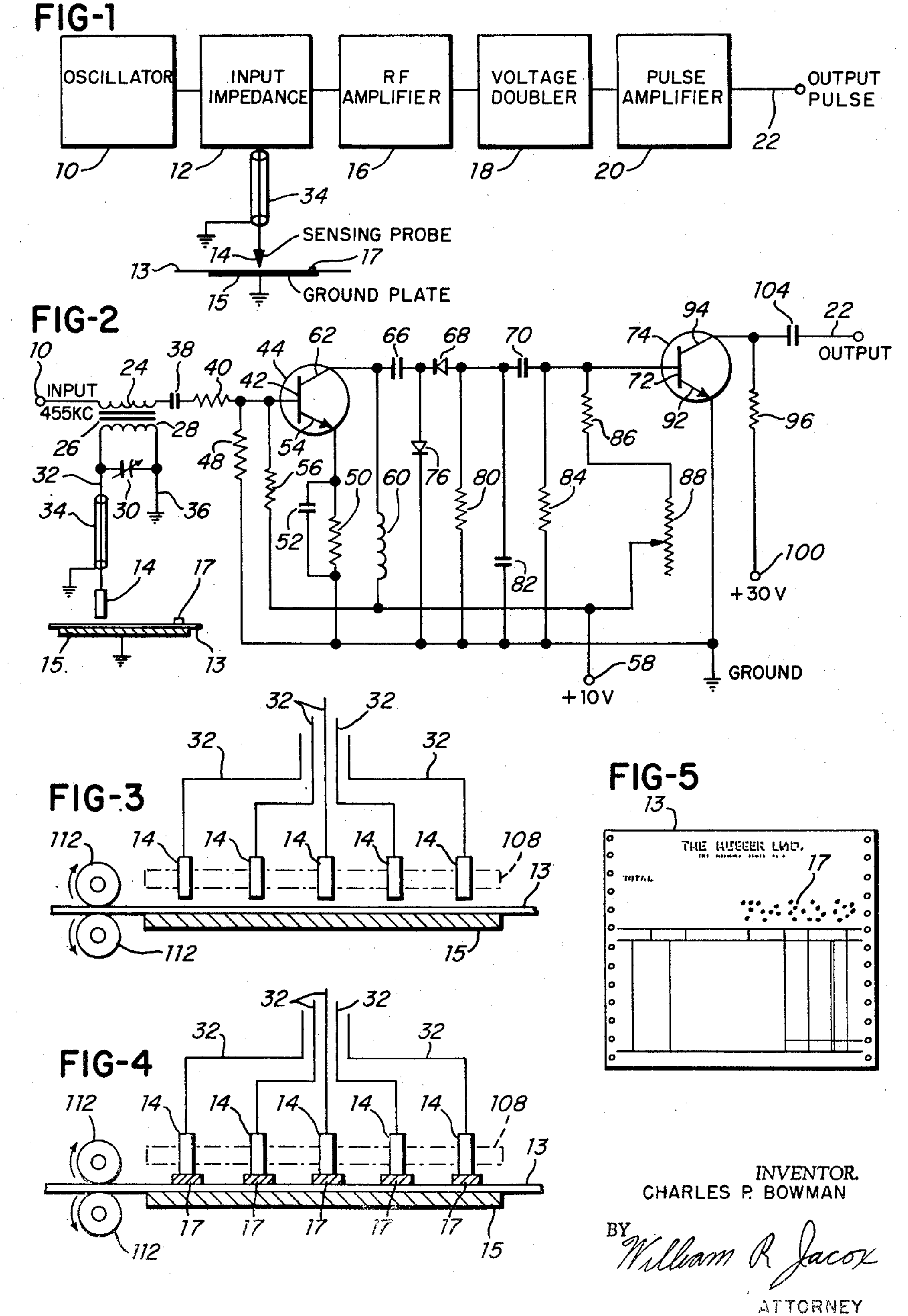
FIGURE 1 is a diagrammatic view of portions of sensing circuitry of this invention.
FIGURE 2 is a circuit diagram of an individual sensing circuit of this invention.
FIGURE 3 is a diagrammatic view showing a sensing head with multiple probes used in conjunction with circuitry of this invention.
FIGURE 4 is a diagrammatic view illustrating the multiple sensing head of FIGURE 3 in position for sensing.
FIGURE 5 is a diagrammatic view illustrating one type of record material having information which may be sensed by circuitry of this invention.

Referring to the drawing in detail, control circuitry of this invention as shown in FIGURE 1 includes an oscillator 10 which provides a substantially constant frequency voltage to an impedance section 12. The impedance section 12 has connected thereto a sensing probe or electrode 14. The probe 14 is adapted to engage a sheet or web 13 having information deposits 17 carried thereby so that the probe 14 senses any information which is carried by the sheet or web 13 at the position engaged by the probe 14. Such a sheet or web 13 is supported, at least in part, by a grounded plate 15. Thus, the probe 14 and the plate 15 serve as connector elements or capacitor elements. These elements 14 and 15 are separated by a dielectric which comprises the sheet 13. Thus, the normal capacitance between the probe 14 and the plate 15 is determined by the web or sheet 13. When a portion of the web 13 which carries an information deposit 17 is between the probe 14 and the plate 15, the capacitance between the probe 14 and the plate 15 is different from the normal value thereof. The material of a deposit 17 may be any suitable material which causes the capacity between the probe 14 and the plate 15 to be appreciably different from that of the web 13 alone. Preferably, the material of a deposit 17 is reasonably electrically conductive.

The impedance section 12 is connected to an amplifier section 16, which, in turn, is connected to a voltage doubler section 18. The voltage doubler section 18 is connected to a pulse amplifier section 20, which has an output line 22 joined thereto.

FIGURE 2 illustrates in detail the component parts of the circuitry of this invention. The oscillator 10 is adapted to provide a source of electrical energy which has substantially constant frequency and substantially constant voltage. A frequency of 455 kilocycles per second has been found to be very satisfactory. The voltage of this signal provided by the oscillator 10 may be of any suitable value.

A winding 24 of a transformer 26 is connected to the oscillator 10. The transformer 26 also has a winding 28 which has an adjustable capacitor 30 connected in parallel therewith. A lead 32 extends from one side of the winding 28 and the capacitor 30 and connects to the sensing probe 14. It is advisable that the lead 32 be shielded by any suitable shield member 34, as shown. The shield member 34 is connected to ground. A lead 36 joins the opposite end of the winding 28 and the capacitor 30 to ground.

The winding 24 of the transformer 26 has connected in series therewith a capacitor 38 and a resistor 40. The resistor 40 is connected to a base 42 of a transistor 44.

Connected from the base 42 to ground is a resistor 48. A resistor 50 and a capacitor 52 are connected in parallel and join an emitter 54 of the transistor 44 to ground.

A resistor 56 is connected from the base 42 of the transistor 44 to a source of positive potential 58, herein shown as being +10 v. An inductance element 60 joins a collector 62 to the source of positive potential 58.

A capacitor 66, and a unidirectional current device, such as a rectifier or diode 68, and a capacitor 70 are connected in series relationship between the collector 62 of the transistor 44 and a base 72 of a transistor 74. From a position intermediate the capacitor 66 and the diode 68, a diode 76 connects to ground. From a position intermediate the diode 68 and the capacitor 70, a resistor 80 and a capacitor 82 are joined in parallel relation to ground. A resistor 84 connects from the base 72 of the transistor 74 to ground. A fixed resistor 86 and an adjustable resistor 88 are in series between the base 72 of the transistor 74 and the source of positive potential 58.

An emitter 92 of the transistor 74 is connected to ground. A collector 94 of the transistor 74 is joined to a resistor 96 which is connected to a positive bias potential 100, herein shown as being +30 v. The collector 94 is shown joined to the output line 22, through a capacitor 104.

*Operation*

As shown in FIGURE 3, a plurality of sensing probes 14 are used to read or sense information carried by the sheet or web 13. A circuit of the type shown in FIGURES 1 and 2 is connected to each of the probes 14. The probes 14 may be fixed but are shown herein as being supported by a carrier 108 which moves the probes 14 toward and away from the grounded plate 15. The sheet or web 13 is moved over the plate 15 by engagement wheels 112. The carrier 108 may also be laterally movable, if desired.

As shown in FIGURE 4, the sheet 13 is provided with a plurality of information deposits, or spots 17, which may appear as shown in FIGURE 5 or in any other suitable manner. The deposits 17 are arranged to provide any desired information. Each deposit 17 of material is applied to the sheet or web 13 in any suitable manner, such as by sales record machines or the like, or by manual means.

Usually the probes 14 are arranged in groups, with each group constituting a line of probes 14. Ordinarily, the carrier 108 moves into and out of engagement with the web 13 as the web 13 is moved over the plate 15 by the wheels 112. Upon each movement of the probes 14 toward the web 13, one or more of the probes 14 come into engagement with one or more deposits 17. Only those probes 14 which engage a deposit 17 sense a sufficient change in capacitance to cause operation of the control circuitry connected thereto.

As shown in FIGURES 1 and 2 and as discussed above, a signal, which is substantially constant in frequency and voltage, is applied to each individual circuit shown in FIGURES 1 and 2. The transformer 26 couples the sensing probe 14 to the input circuit of the transistor 44. The normal input impedance level to the transistor 44 is adjusted by means of the capacitor 30 which is in parallel with the winding 28 of the transformer 26. Due to the fact that the current through the base 42 of the transistor 44 is determined by the input impedance thereto, the normal current through the transistor 44 is determined by the adjustment or setting of the capacitor 30.

As the web or sheet 13 is moved along the plate 15 by the wheels 112, the deposits 17 are moved to positions adjacent the probes 14. When a probe 14 is in engagement with one of the deposits 17, the capacitance across the winding 28 of the transformer 26 is changed. Thus, the input impedance to the base 42 of the transistor 44 is changed. This results in a change in the amount of current flowing through the base 42. This change in current through the base 42 is amplified by the transistor 44 and is rectified by the diodes 68 and 76 of the voltage doubler section of the circuitry.

The capacitor 70 provides capacity coupling between the voltage doubler section and the pulse amplifier section. Therefore, preferably, the rise time of potential in the voltage doubler is rapid in order to provide a pulse of sufficient magnitude to be amplified by the pulse amplifier transistor 74. For this reason the apparatus illustrated by FIGURES 3 and 4 is arranged so that there is rapid relative movement between the probes 14 and the deposits 17. As stated above, the probes 14 may be fixed and engageable by the deposits 17 during movement of the web 13. However, preferably, the carrier 108 moves the probes 14 with respect to the web 13. The carrier 108 may be capable of moving the probes 14 along lines somewhat parallel, as well as normal, to the web 13. Therefore, there may be rapid relative movement between the probes 14 and the web 13 in more than one direction. The change in current through the transistor 44 in each sensing circuit thus appears as a pulse through the capacitor 70 to the transistor 74 and is amplified thereby when a deposit 17 is engaged by the probe 14 of the circuit.

The effective capacitance of the capacitor elements consisting of the probe 14 and plate 15 is compensated by a bias voltage established from the source of positive potential 58. This source of potential 58 is connected to the base 42 of the transistor 44 and to the base 72 of the transistor 74 by means of the resistors 56, 86, and 88. This compensation may be adjusted by means of the adjustable resistor 88.

The pulse amplifier transistor 74, by means of the source of positive potential 100, is biased to saturation so that small changes in capacity, as a result of unintentional dielectric changes in the web 13 are not sufficient to cause a pulse to be amplified and transmitted to the output line 22. Thus, the transistor 74 produces a pulse output only when a probe 14 senses a deposit 17. This pulse output is transmitted to any suitable apparatus or device through the output line 22.

The output line 22 of each sensing circuit is ordinarily connected to any receiver device or apparatus for registering or recording information sensed by the entire group of probes 14.

Therefore, it is understood that the circuitry of this invention is capable of accurately sensing changes in capacitance caused by information applied to a web or sheet. The circuitry is also capable of accurately transmitting a signal or signals to a receiver device.

The transistors herein are shown as being of the NPN type. However, it is to be understood that PNP type transistors may be used with changes in polarity in the circuitry.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Apparatus for sensing a web having restricted deposits of material applied thereto comprising a pair of spaced-apart electrodes, there being one electrode on each side of the web, a first transistor provided with a base and a collector and an emitter, a source of substantially constant frequency energy, impedance means connecting the source of energy to the base of the first transistor, transformer means connecting the electrodes to the impedance means so that a capacitance change between the electrodes changes the effective impedance between the source of energy and said base of the first transistor, a second transistor having a base and a collector and an emitter, capacity means coupling the collector of the first transistor to the base of the second transistor, means biasing the second transistor to saturation, and output means connected to the collector of the second transistor.

2. In combination, a sensing probe, a support plate, the support plate being connected to ground, a transformer having a first winding and a second winding, the first winding of the transformer having one terminal connected to ground and another terminal connected to the probe, an adjustable capacitor connected across the first winding of the transformer, a first transistor, a second transistor, a source of constant frequency energy, means providing a substantially constant current between the source of energy and the first transistor, said means including the second winding of the transformer so that the value of current flow through said means is adjusted by the value of the capacitance across the first winding of the transformer, the value of the capacitance across the first winding being dependent upon the value of the capacitance of adjustable capacitor and the value of the capacitance between the sensing probe and the support plate, connector means connecting the output of the first transistor to the second transistor, said connector means including pulse transmission means, and output means connected to the second transistor.

References Cited by the Examiner

UNITED STATES PATENTS

| | | | |
|---|---|---|---|
| 1,855,569 | 4/32 | Chireix | 235—61.116 |
| 1,905,332 | 4/33 | Barbulesco | 235—61.116 |
| 2,094,351 | 9/37 | Draper et al. | 235—61.116 |
| 2,222,221 | 11/40 | Burford | 179—100.4 |
| 2,294,681 | 9/42 | Moon | 235—61.116 |
| 2,382,461 | 8/45 | Antalek | 179—100.4 |
| 2,512,879 | 6/50 | Roggenstein | 235—61.116 |
| 2,546,784 | 3/51 | Roggenstein | 235—61.116 |
| 2,837,662 | 6/58 | Ehret | 307—88.5 |
| 2,847,159 | 8/58 | Curtis | 307—88.5 |
| 2,870,399 | 1/59 | Davidson et al. | 323—75 |
| 2,941,718 | 6/60 | Lubkin | 235—61.116 |
| 2,977,487 | 3/61 | Congdon | 307—88.5 |

IRVING L. SRAGOW, *Primary Examiner.*

JOHN F. BURNS, *Examiner.*